United States Patent [19]
Barrett

[11] Patent Number: 5,828,135
[45] Date of Patent: Oct. 27, 1998

[54] RAILROAD CAR WITH AXLE-MOUNTED ELECTRICAL GENERATOR

[76] Inventor: John Barrett, 7636 Miramar Rd. Suite 1400, San Diego, Calif. 92126

[21] Appl. No.: 710,132

[22] Filed: Sep. 13, 1996

Related U.S. Application Data

[63] Continuation-in-part of Ser. No. 656,689, May 28, 1996.

[51] Int. Cl.⁶ .............................. F01B 31/00; F01K 3/00
[52] U.S. Cl. .............................. 290/3; 290/1 R; 188/290; 188/294; 310/75 R; 310/90
[58] Field of Search .............................. 290/3 R; 322/20, 322/46; 188/290–294; 310/75 R, 90

[56] References Cited

U.S. PATENT DOCUMENTS

| | | | |
|---|---|---|---|
| 2,422,946 | 6/1947 | Brittain, Jr. ............................. | 105/96.1 |
| 4,377,975 | 3/1983 | Scott et al. ............................. | 105/96.1 |
| 4,539,496 | 9/1985 | Thomas et al. ....................... | 310/68 B |
| 4,539,497 | 9/1985 | Boyer ................................... | 310/75 R |
| 4,657,289 | 4/1987 | Boyer ...................................... | 310/1 R |
| 5,215,156 | 6/1993 | Stulbach et al. ........................ | 180/65.3 |
| 5,345,878 | 9/1994 | Jacob ...................................... | 105/136 |
| 5,440,184 | 8/1995 | Samy et al. .............................. | 310/90 |
| 5,488,287 | 1/1996 | Kemmer et al. .......................... | 322/20 |
| 5,566,795 | 10/1996 | Barefoot .................................. | 188/294 |
| 5,585,711 | 12/1996 | Kemner et al. ........................... | 322/46 |

*Primary Examiner*—Steven L. Stephan
*Assistant Examiner*—Elvin G. Enad
*Attorney, Agent, or Firm*—Lyon & Lyon LLP

[57] ABSTRACT

An electrical generator for mounting on a railroad car axle end which utilizes the rotation of the axle to generate electricity. The generator includes a housing assembly bolted to the end of a railroad car axle, preferably using the bolt holes that are present on conventional axle ends. The housing includes a tubular rim along which is mounted a plurality of spaced permanent magnets. A stator fastened to a stationary part of the car, typically the outer race of the axle bearing, mounts a plurality of coils in a circular array, closely spaced to the magnets. Electricity is generated whenever the car axle is rotating.

5 Claims, 4 Drawing Sheets

RAILROAD CAR WITH AXLE-MOUNTED ELECTRICAL GENERATOR

CROSS-REFERENCE TO RELATED PATENT APPLICATION

This application is a continuation-in-part of pending U.S. patent application Ser. No. 08/656,689 filed May 28, 1996, from which priority is claimed, and which is fully incorporated by reference herein.

BACKGROUND OF THE INVENTION

This invention relates in general to electrical generators and more specifically to an electrical generator adapted to be mounted directly on a railroad car axle for generating electricity.

Conventional railroad freight cars have always operated without electrical power, with old fashioned air-actuated brakes accomplishing the braking. Generally, compressed air is routed through hoses to brakes at each car. In very long trains with many cars, an appreciable amount of time is required to actuate the brakes in the last car. Typically, the last car in a 100 car train will be actuated about 40 seconds after the brakes are applied by the engineer in the engine. This raises safety concerns because of the potential danger to the train and its contents or whatever is in its way if a quick stop is needed.

The capacity of the train braking system is also severely limited with air braking systems with long, high speed, trains. Once the brakes are applied, there is an appreciable amount of time before enough air is repressurized to permit another full brake application. Trains moving over a mountain pass are generally required to test the brakes during the uphill portion of the trip. If the test is performed too close to the summit, there may not be sufficient air pressure during the initial downhill portion, increasing the possibility of a catastrophic accident.

Since there is no provision of electrical energy at each freight car, the cars cannot carry running lights of the sort required in highway trucks, ships and the like. On a dark night, with a very long train moving uphill slowly across unguarded crossings, drivers of automobiles and trucks moving at high speed often do not see the cars of a train crossing the road and run into the side of the train. Running lights on the sides the cars could prevent these serious and often fatal accidents. Such lights could take the form of rows of small lights, or even advertisements for the companies whose products are being shipped.

With conventional railroad cars, the temperature of bearings, temperature within the car and other conditions must be manually checked by railroad personnel while the train is stopped, Attempts to sense such conditions and transmit readings to remote locations through the use of batteries have not been fully successful due to the relatively short life of the batteries and the need to regularly check and replace them.

Conventional gasoline powered generators have not been found to be effective for railroad cars because of the expense, lack of long term reliability, difficult maintenance, difficulty in turning them on and off as needed and operating them for very long periods.

The use of of a traditional alternator coupled to the railroad car's rotating axle is unsatisfactory as well. This type of alternator, found in virtually all cars today, uses an electromagnet to assist in generating electrical power. The electromagnet is adjusted with carbon brushes which can spark creating a fire hazard if the railroad car is being loaded with flammable material. Furthermore, the electromagnet is bulky and cannot be mounted flushly on a railroad axle. Unlike the present invention, the bulky electromagnet requires its own bearings for its rotation whereas the present invention uses the railroad car's own wheel bearings for this function. Attempts to design electrical generators powered by rotating components of railroad cars have not been successful due to the cumbersome, complex arrangements and the resulting lack of reliability and safety.

Thus, there is a continuing need for electrical power at each railroad car in a train that is reliable, inexpensive, and can operate fast-acting electrical brakes, running lights, sensors and transmission systems for sensed information etc.

SUMMARY OF THE INVENTION

The above-noted problems, and others, are overcome in accordance with this invention by a unique electrical generator mounted on a railroad car and driven by rotation of a car axle. This generator includes a housing assembly fastenable to the axle housing of a railroad car for rotating about an axis, the housing assembly having a circular tubular wall spaced from the axle and having a ring of permanent magnets on the interior of the wall. In the preferred embodiment, a stator consisting of a ring of coils is mounted closely adjacent to the magnets on a coil mounting assembly secured to the railroad car's axle housing. A bearing isolates the stator from the occasional rotation of the axle housing. The stator is held stationary on the bearing by means of a pocket on the stator cover receiving a pin on the railroad car's adapter. The relative rotation of coils and magnets provides the desired electrical energy.

Thus an object of this invention to provide a railroad car generator driven by axle rotation relative to the car.

Another object is to provide a railroad car generator of improved simplicity and reliability.

A further object is to provide a means for permitting the use of electrical brakes and running lights on conventional railroad cars.

Still another object is to provide a method of electrically actuating railroad car brakes and making the cars visible at night.

Other objects are either inherent or discernible from the detailed description of the invention.

BRIEF DESCRIPTION OF THE DRAWINGS

Details of the invention, and of preferred embodiments thereof, will be further understood upon reference to the drawings, wherein.

DETAILED DESCRIPTION OF THE PREFERRED EMBODIMENT

This invention produces electricity through the relative motion of permanent magnets adjacent to stationary coils about the railroad axle. The magnets will rotate in a housing about the axle in a plane parallel with the wheel. The coils and magnets should be positioned no more than approximately 30 thousands of an inch apart to efficiently generate electricity. A coil mounting secured around the axle must be aligned with the axle so as to achieve this close tolerance. However, securing the coil mounting assembly about the axle presents several problems.

Figure 1:
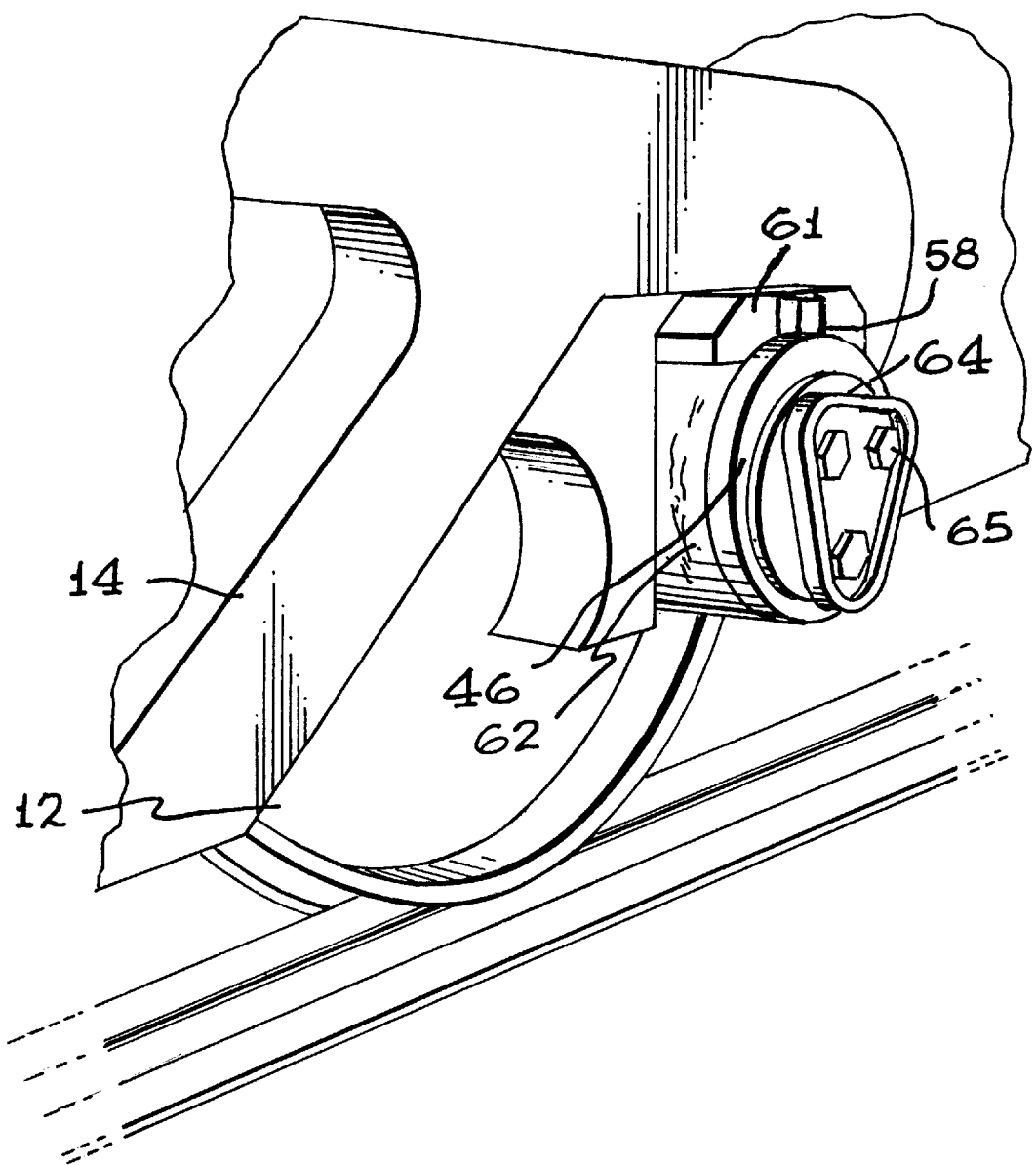
FIGS. 1 and 2 show a front perspective view of a conventional domestic railroad freight car wheel and its associated structure.
Figure 2:
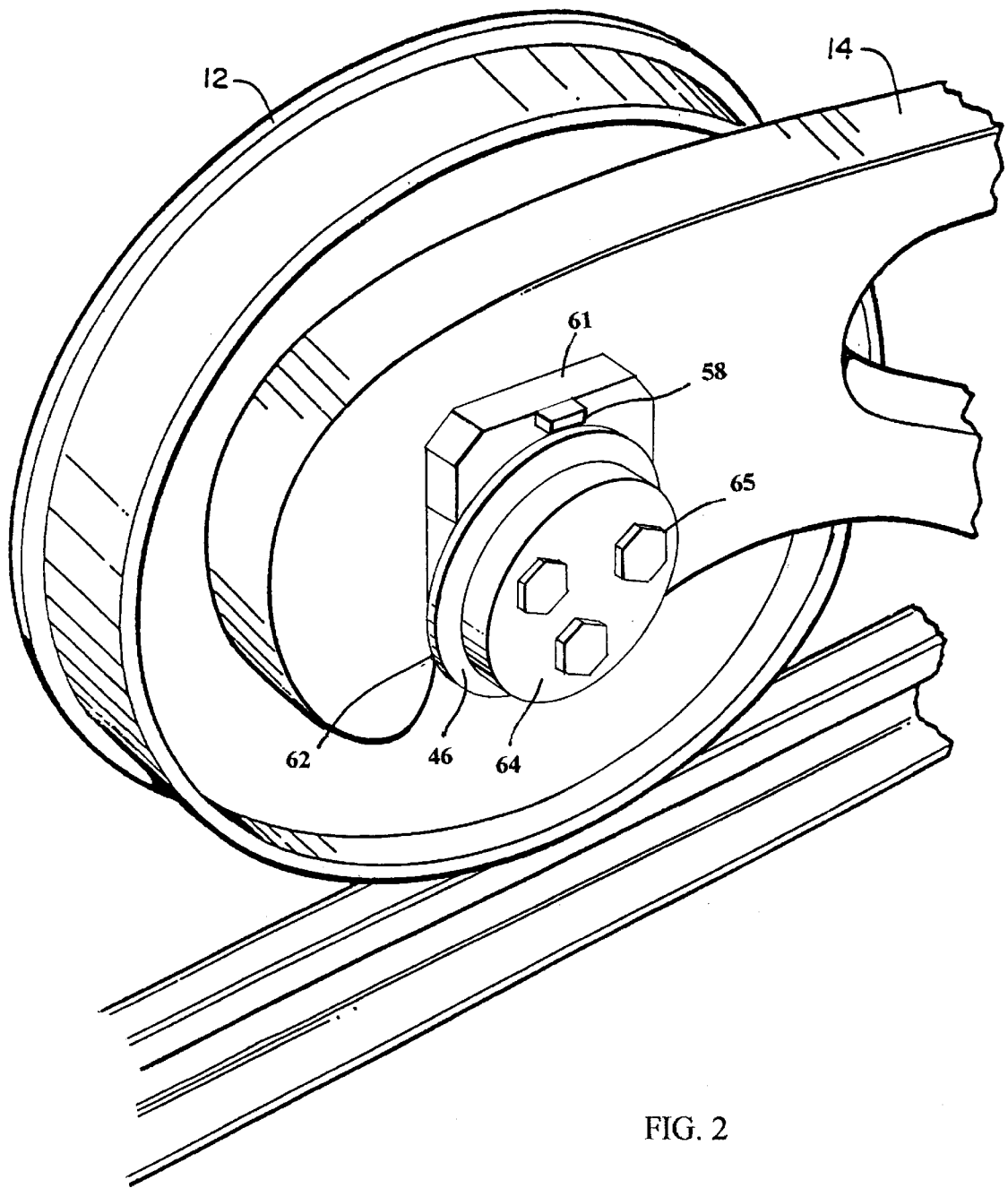

To demonstrate these problems, we turn to FIGS. 1 and 2 which illustrate a typical railroad wheel assembly found on domestic freight cars. The railroad wheel 12 mounts on an axle (not seen) which spins within a bearing consisting of an outer race 62, taper bearings (not seen), and an inner race (not seen). The axle terminates in an end cap 64 which rotates as the wheel rotates. A plurality of bolts 65, usually three, secure the endcap to the end of the axle. Between the inner race and the outer race 62 of the bearing is a metal seal housing 46 which is fixed with the outer race. Atop the outer race 62 rests an adapter 61 upon which the freight car frame member, typically referred to as a bolster, 14 rests.

Unlike most automotive applications, the frame of each car is not fastened to each axle, but rather the bolter and the adapter are simply placed onto the the axle and held there only by the force of gravity. When the train rolls on the railroad track, only the considerable weight of the freight car pressing through the adapter 61 onto the outer race 62 of the wheel bearing prevents the outer race 62 from rotating as the wheel 12 rotates. This is in marked contrast with an automobile in which the wheels, axle and wheel bearings are firmly attached to the automobile frame. Because the freight car's wheel bearing, wheel 12, and axle are not rigidly fixed to the adapter 61, when the freight car travels at high speeds and hits a slight bump in the track, enough weight is removed from the adapter 61 as to allow the outer race 62 of the wheel bearing to rotate occasionally. Since the seal housing 46 is attached to the outer race 62, the seal housing 46 will likewise occasionally rotate.

This presents a problem in attaching any generator to the axle. A coil mount around the outer race 62 or the seal housing 46 is desirable because these parts are accessible and will allow an easy alignment with the rotating magnets with the required small tolerances. However, a mounting attached to seal housing 46 or outer race 62 will rotate occasionally as described above. The stator assembly contains wiring which must be fixed to the train as movement would shear the wiring. A mounting on the outer race 62 or the seal housing 46 would thus eventually shear the wiring of the generator.

While at first blush, the freight car bolster 14 or the adapter 61 might be seen as offering stationary mounting surfaces as an alternative to mounting the coil mounting assembly on the outer race 62 or the seal housing 46, such an alternative presents problems as well. Any drilling or welding on the frame truck 14 or the adapter 62 for attachment means would raise safety concerns by possibly weakening essential train supports. Moreover, this is not typically permitted by railroad customs, regulations or accepted practice. Finally, such a mounting would not be easily aligned about the axle as would a mount about the outer race 62 or the seal housing 46. The close tolerances required between the coils and magnets would be quite difficult to achieve with a mounting attached to the truck 14 or the adapter 61.

Figure 4:
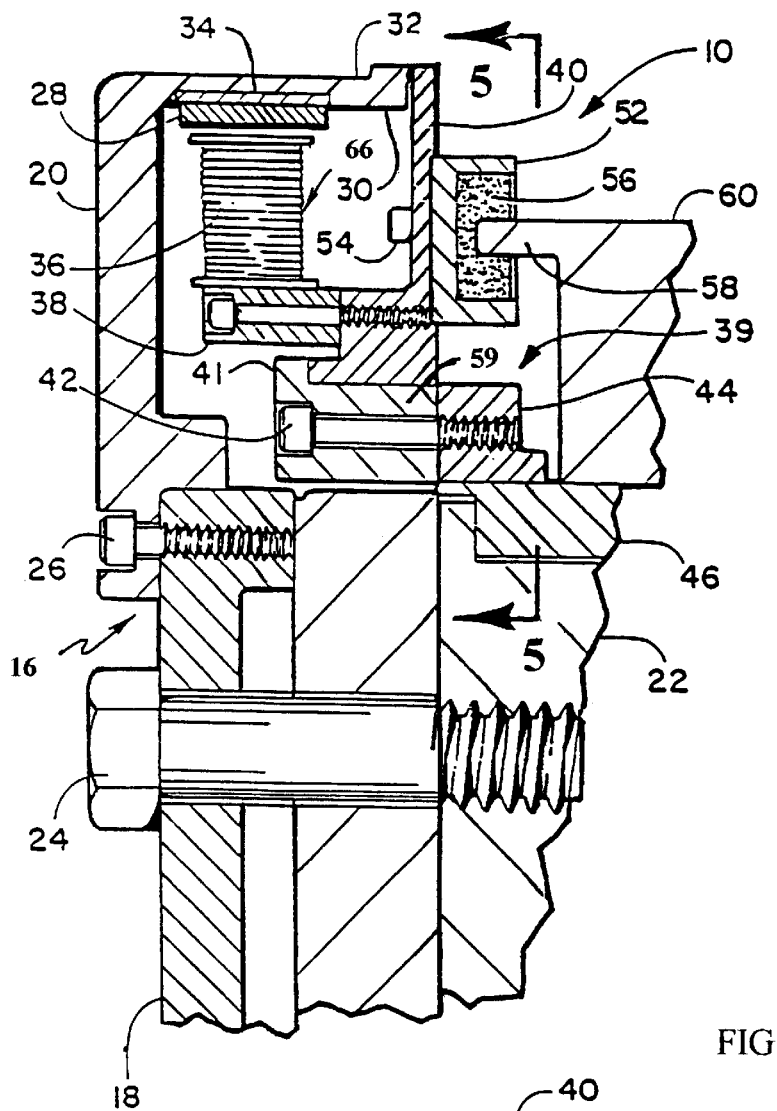
FIG. 4 is a partial section view taken on line 2—2 in FIG. 2.
Figure 5:
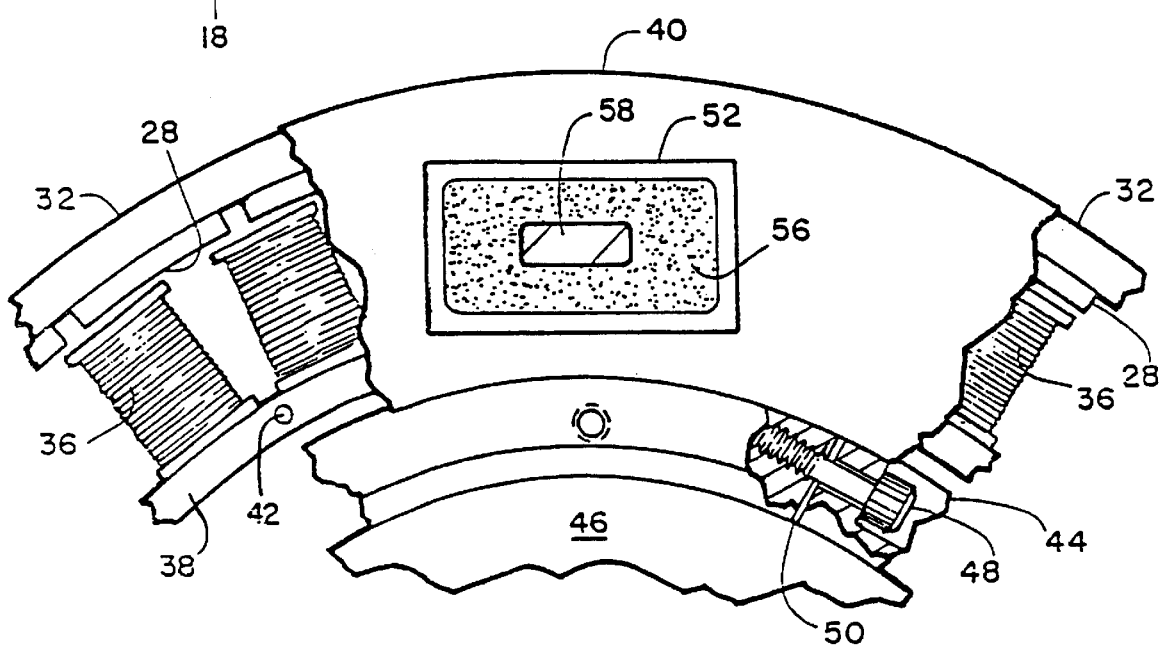
FIG. 5 is a rear elevation view taken on line 3—3 in FIG. 3.

In accordance with the teachings of the present invention, the following coil mounting illustrated in FIGS. 4 and 5 solves the above-described problems. The coil mounting assembly 39 includes a circular clamp band 44 around seal housing 46 fixed to the outer race 62 of the wheel bearing at the axle distal end. Circular clamp band 44 is tightened against seal housing 46 by a bolt 48 spanning a gap 50 in band 44. Axle 22 rotates relative to metal seal 46 through a conventional wheel bearing, not shown. Note that since the adapter 61 (as illustrated in FIGS. 1 and 2) covers the entire upper surface of outer race 62, the seal housing 46 presents the preferred mounting surface as this would not require modification of the adapter 61.

As previously described above, the outer race 62 and the seal housing 46 of the railroad car's wheel bearing will occasionally rotate. Such rotation would shear the wiring of the coils. The coils are thus isolated from this occasional rotation by the use of a bearing. For example, a bushing 59 having a retaining collar 41 can be attached to the circular clamp band 44 by a plurality of bolts 42. The retaining collar 41 on the bushing 59 retains the stator 66 against the bearing surface of the bushing 59.

The stator 66 includes a plurality of coils 36 on coil ring 38 attached to circular mounting ring 40. The circular mounting ring 40 is retained by the retaining collar 41 on bushing 59. In order to prevent the stator 66 from moving relative to bushing 59, at least one pocket member 52 is fastened to circular mounting ring 40 by a bolt 54, welding or the like. Pocket member 52 may be filled with a tough elastomeric material 56, such as urethane rubber, and is recessed to receive a projection 58 on adapter 61.

Conveniently, as illustrated in FIGS. 1 and 2, such a projection 58 is included on adapter 61 which is standard equipment on freight trains domestically. Thus, installation of this invention requires no machining or alteration of existing train equipment.

The housing assembly 16 includes the circular central plate 18 and a circular magnet mounting ring housing 20. The circular magnet mounting ring housing 20 is held to circular central plate 18 by a plurality of bolts 26. If desired, the entire housing assembly 16 could be machined from one metal preform. The circular magnet mounting ring housing 20 has an upstanding rim 32 for supporting internal components. A plurality of permanent magnets 28, typically ceramic ferrite magnets or the sort available from the Arnold Engineering Company, Servierville, Tenn. are bonded by a thin layer of epoxy resin or the like in recesses in the internal surface rim 30. Preferably, for ease of machining and to lessen the weight, the circular magnetic ring housing 20 is composed of aluminum or plastic in which case a thin ferrous metal ring 34 is provided behind magnets 28 to enhance generator performance. Varying the thickness of ferrous metal ring 34 allows for different output amperages using the same magnets 28. Since the magnets 28 are expensive, this lowers manufacturing costs by allowing different amperage outputs using the same standardized magnet 28.

The circular central plate 18 of the housing assembly 16 is secured to the car axle 22 by a plurality of bolts 24 of the sort normally extending from the endcap 64 of the axle. Endcap 64 (seen in FIGS. 1 and 2) is removed, and conventional bolts 65 (seen in FIGS. 1 and 2) already in place in the axle end are simply replaced with slightly longer bolts 24 to accommodate the thickness of the circular central plate 18.

Circular mounting ring 40 of the stator 66 includes an upstanding circular wall portion which cooperates with the distal edge of rim 32 of the housing assembly 16 in a generally sealing relationship to keep most dirt and other debris out of the coil and magnet area.

Any suitable number of coils 36 and magnets 28 may be used. Output voltage can be varied by varying the number of turns on the coils 36, the height of the coil 36, the thickness of the ferrous ring 34 behind the magnets 28, etc. Of course, a conventional voltage regulator may be used although it is generally not necessary. Preferably, the car will carry batteries, typically conventional 12 volt lead-acid batteries, to provide power while the car is stopped. Generally, generator output of about 12.5 TO 13.5 volts is preferred. The inventor has found that sufficient electricity will be generated to charge batteries at train speeds of 7 miles per hour and greater.

Figure 3:
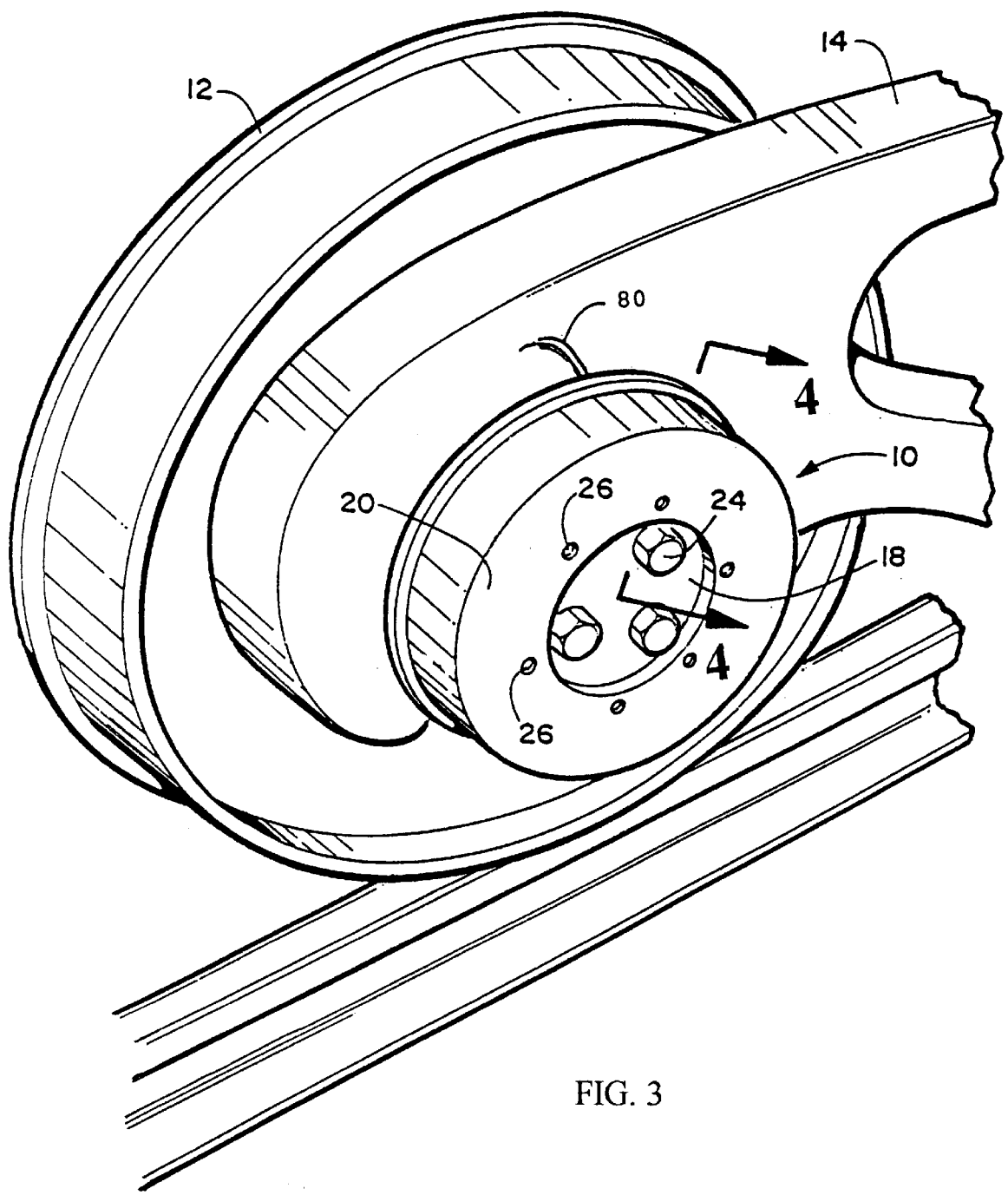
FIG. 3 is a front perspective view of the railroad generator mounted on a railroad wheel axle and truck.

Referring to FIG. 3, there is seen a front perspective view of the generator 10 mounted on a railroad car axle (not seen). Generated electricity passes through a hole (not shown) in mounting ring 40 via cable 58 into the car to charge batteries or power electrical equipment. Note that although the generator 10 covers the end of the axle, railroad personnel will still have access to bolts 24 for maintenance and safety inspections.

Thus, this generator is easily mounted on a conventional railroad car axle end portion to generate electricity for use in electrical braking systems, car lighting, advertising lighting, transmitting information from on-board sensors to remote data collection locations or any other purpose.

While certain specific relationships, materials and other parameters have been detailed in the above description of preferred embodiments, those can be varied, where suitable, with similar results. Other applications, variations and ramifications of the present invention will occur to those skilled in the art upon reading the present disclosure. Those are intended to be included within the scope of this invention as defined in the appended claims.

I claim:

1. In a railroad car having a bolster, an adapter supporting the bolster, an axle housing including an outer race and a metal seal cover, an axle rotating within the axle housing, an electrical generator which comprises:

a housing assembly having a base and an upstanding rim having an interior surface;

means for attaching the housing assembly to the railroad car axle for rotation therewith;

a plurality of spaced permanent magnets on the interior surface of the rim;

a coil mounting assembly with an attaching means for mounting to the axle housing, said coil mounting assembly rotating as said axle housing rotates;

a bearing means attached to the coil mounting assembly;

a stator carrying a plurality of coils positioned within the rim with the coils adjacent to the magnets;

wherein the stator is slidably connected to the bearing means, said stator held stationary with respect to the rotation of said coil mounting assembly.

2. The device of claim 1 wherein the stator includes a pocket member wherein the pocket member receives an adapter pin located on said adapter.

3. The device of claim 2 wherein the attaching means comprises a circular clamp band secured to the coil mounting assembly, the circular clamp band having a predetermined circumference sized to fit around an exterior circular surface of the axle housing and further including means for reducing the circumference of the circular clamp band to tightly engage the exterior circular surface of the axle housing.

4. The device of claim 3 wherein the housing assembly is constructed of aluminum and further comprises a ferrous ring between the permanent magnets and the rim of the housing assembly.

5. The device of claim 4 wherein the bearing means comprises a ring-shaped bushing.

* * * * *